US011004262B2

(12) United States Patent
Isler et al.

(10) Patent No.: US 11,004,262 B2
(45) Date of Patent: May 11, 2021

(54) SEMANTIC STRUCTURE FROM MOTION FOR ORCHARD RECONSTRUCTION

(71) Applicant: Regents of the University of Minnesota, Minneapolis, MN (US)

(72) Inventors: Ibrahim Volkan Isler, Minneapolis, MN (US); Wenbo Dong, Minneapolis, MN (US); Pravakar Roy, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 16/540,279

(22) Filed: Aug. 14, 2019

(65) Prior Publication Data

US 2020/0058162 A1 Feb. 20, 2020

Related U.S. Application Data

(60) Provisional application No. 62/718,740, filed on Aug. 14, 2018.

(51) Int. Cl.
*G06T 17/05* (2011.01)
*G06T 17/10* (2006.01)
*G06T 7/579* (2017.01)

(52) U.S. Cl.
CPC .............. *G06T 17/05* (2013.01); *G06T 7/579* (2017.01); *G06T 17/10* (2013.01); *G06T 2207/10012* (2013.01); *G06T 2207/30188* (2013.01); *G06T 2219/2004* (2013.01)

(58) Field of Classification Search
None
See application file for complete search history.

(56) References Cited

U.S. PATENT DOCUMENTS

2014/0354630 A1* 12/2014 Kim ........................ G06T 17/00
345/419

OTHER PUBLICATIONS

Noha M. Elfiky et al, "Automation of Dormant Pruning in Specialty Crop Production: An Adaptive Framework for Automatic Reconstruction and Modeling of Apple Trees", 2015 IEEE Conference on Computer Vision and Pattern Recognition Workshops (CVPRW), IEEE Xplore: Oct. 26, 2015.*

Bac et al., Stem localization of sweet-pepper plants using the support wire as a visual cue, Computers and Electronics in Agriculture, vol. 105, pp. 111-120, 2014.

(Continued)

*Primary Examiner* — Tize Ma
(74) *Attorney, Agent, or Firm* — Theodore M. Magee; Westman, Champlin & Koehler, P.A.

(57) ABSTRACT

A method includes constructing a three-dimensional model of a front side of a row of trees based on a plurality of images of the front side of the row of trees and constructing a three-dimensional model of a back side of the row of trees based on a plurality of images of the back side of the row of trees. The three-dimensional model of the front side of the row of trees is merged with the three-dimensional model of the back side of the row of trees by linking a trunk in the three-dimensional model of the front side to a trunk in the three-dimensional model of the back side to form a merged three-dimensional model of the row of trees. The merged three-dimensional model of the row of trees is used to determine a physical attribute of the row of trees.

15 Claims, 9 Drawing Sheets

(56) References Cited

OTHER PUBLICATIONS

Bargoti et al., A pipeline for trunk detection in trellis structured apple orchards, Journal of Field Robotics vol. 32, No. 8, pp. 1075-1094, 2015.
Beder et al., Direct solutions for computing cylinders from minimal sets of 3D points, Computer Vision-ECCV, pp. 135-146, 2006.
Bowman et al., Probabilistic data association for semantic SLAM, IEEE International Conference on Robotics and Automation (ICRA), pp. 1722-1729, 2017.
Canny, A computational approach to edge detection, IEEE Transactions on Pattern Analysis and Machine Intelligence, vol. PAMI-8, No. 6, pp. 679-698, 1986.
Agarwal et al., http://ceres-solver.org, 1 page, 2012.
Curless et al., A volumetric method for building complex models from range images, in Proceedings of the 23rd annual conference on Computer graphics and interactive techniques, pp. 303-312, 1996.
Del-Moral-Martinez et al., Georeferenced scanning system to estimate the leaf wall area in tree crops, Sensors, vol. 15, pp. 8382-8405, 2015.
Dong et al., Linear velocity from commotion motion, IEEE/RSJ International Conference on Intelligent Robots and Systems (IROS), pp. 3467-3472, 2017.
Dong et al., A novel method for the extrinsic calibration of a 2D laser rangefinder and a camera, Department of Computer and Science and Engineering, 12 pages, 2016.
Edelsbrunner et al., On the shape of a set of points in the plane, IEEE Transactions on Information Theory, vol. IT-29, No. 4, pp. 551-559, 1983.
Edelsbrunner et al., Three-dimensional alpha shapes, ACM Transactions on Graphics, vol. 13, No. 1, pp. 43-72, 1994.
Fischler et al., Random sample consensus: A paradigm for model fitting with applications to image analysis and automated cartography, Communications of the ACM, vol. 24, No. 6, pp. 381-395, 1981.
Forsyth et al., Structure from Motion, Computer vision: a modem approach, Second Edition, Chapter 8, pp. 221-306, 2011.
Golub et al., An analysis of the total least squares problem, SIAM Journal on Numerical Analysis, vol. 17, No. 6, pp. 883-893, 1980.
Golub et al., Symmetric eigenvalue problems, Matrix Computations, 4th Edition, Chapter 8, pp. 439-448, 2012.
Huber, Robust estimation of a location parameter, The Annals of Mathematical Statistics, pp. 73-101, 1961.
Levenberg, A method for the solution of certain non-linear problems in least squares, Quarterly of Applied Mathematics, vol. 2, No. 2, pp. 164-168, 1944.
Lowe, Distinctive image features from scale-invariant keypoints, International Journal of Computer Vision, vol. 60, No. 2, 28 pages, 2004.
Marquardt, An algorithm for least-squares estimation of nonlinear parameters, Journal of Society for Industrial and Applied Mathematics, vol. 11, No. 2, pp. 431-441, 1963.
Medeiros et al., Modeling dormant fruit trees for agricultural automation, Journal of Field Robotics, vol. 34, No. 7, pp. 1203-1224, 2017.
Mendez et al., Deciduous tree reconstruction algorithm based on cylinder fitting from mobile terrestrial laser scanned point clouds, Biosystems Engineering, vol. 124, pp. 78-88, 2014.
Mur-Artal et al., ORB-SLAM2: an open-source SLAM system for monocular, stereo and RGB-D cameras, IEEE Transactions on Robotics, Vold. 33, No. 5, pp. 1255-1262, 2017.
Newcombe et al., KinectFusion: Real-time dense surface mapping and tracking, 10th IEEE international symposium on, pp. 127-136. IEEE, 2011.
Rodrigues, Des lois geometriques qui regissent les deplacements d'un systeme solide dans l'espace: et de la variation des cordonnees provenant de ces deplacements consider'es independamment des causes qui peuvent les produire. Journal de Mehematiques pures et appliquees 1re serie, tome 5, pp. 380-440, 1840.
Rosell et al., Obtaining the three-dimensional structure of tree orchards from remote 2D terrestrial LIDAR scanning, Agricultural and Forest Meteorology, pp. 1505-1515, 2009.
Rosell, A review of methods and applications of the geometric characterization of tree crops in agricultural activities, Computers and Electronics in Agriculture, vol. 81, pp. 124-141, 2012.
Salas-Moreno et al., Slam++: Simultaneous localisation and mapping at the level of objects, IEEE Conference on Computer Vision and Pattern Recognition (CVPR), pp. 1352-1359, 2013.
Sivic et al., Efficient visual search of videos cast as text retrieval, IEEE Transactions on Pattern Analysis and Machine Intelligence, vol. 31, No. 4, pp. 591-606, 2009.
Sotoodeh, Outlier detection in laser scanner point clouds, International Archives of Photogrammetry, Remote Sensing and Spatial Information Sciences, vol. 36, No. 5, pp. 297-302, 2006.
Strasdat et al., Scale drift-aware large scale monocular SLAM, Robotics: Science and Systems VI, 2, 8 pages, 2010.
Tabb et al., A robotic vision system to measure tree traits, IEEE International Conference on Intelligent Robots and Systems (IROS), pp. 6005-6012, 2017.
Underwood et al., Lidar-based tree recognition and platform localization in orchards, Journal of Field Robotics, vol. 32, No. 8, pp. 1056-1074, 2015.
Underwood et al., Mapping almond orchard canopy volume, flowers, fruit and yield using lidar an dvision sensors, Computers and Electronics in Agriculture, vol. 130, pp. 83-96, 2016.
Van der Heijen et al., Spicy: Towards automated phenotyping of large pepper plants in the greenhouse, Functional Plant Biology, vol. 39, No. 11, pp. 870-877, 2012.
Wang et al., Size estimation of sweet onions using consumer-grade RGB-depth sensor, Journal of Food Engineering, vol. 142, pp. 153-162, 2014.
Wu, Towards linear-time incremental structure from motion, 3DTV-Conference, International Conference, pp. 127-134, 2013.

* cited by examiner

SEMANTIC STRUCTURE FROM MOTION FOR ORCHARD RECONSTRUCTION

CROSS-REFERENCE TO RELATED APPLICATION

The present application is based on and claims the benefit of U.S. provisional patent application Ser. No. 62/718,740, filed Aug. 14, 2018, the content of which is hereby incorporated by reference in its entirety.

This invention was made with government support under 2016-67021-24534 awarded by the United States Department of Agriculture. The government has certain rights in the invention.

BACKGROUND

The estimation of morphological parameters of fruit trees (such as tree height, canopy volume and trunk diameter) is important in horticultural science, and has become an important topic in precision agriculture. Accurate morphology estimation can help horticulturists study to what extent these parameters impact crop yield, health and development. For example, growers try different root stocks to figure out which one produces better yield per volume for a specific geographical area. They also measure parameters such as tree height or trunk diameter to model fruit production. This measurement process is labor-intensive and not necessarily accurate.

3D models of rows of orchard trees can be used for determining the morphological parameters of fruit trees, to automate pruning of trees, and to estimate yields. To construct such 3D models, images of the orchard trees are collected and combined to determine the 3D locations of various points of each tree.

The discussion above is merely provided for general background information and is not intended to be used as an aid in determining the scope of the claimed subject matter. The claimed subject matter is not limited to implementations that solve any or all disadvantages noted in the background.

SUMMARY

A method includes constructing a three-dimensional model of a front side of a row of trees based on a plurality of images of the front side of the row of trees and constructing a three-dimensional model of a back side of the row of trees based on a plurality of images of the back side of the row of trees. The three-dimensional model of the front side of the row of trees is merged with the three-dimensional model of the back side of the row of trees to form a merged three-dimensional model of the row of trees. The merged three-dimensional model of the row of trees is used to determine a physical attribute of the row of trees.

In accordance with a further embodiment, a three-dimensional model of a front side of a row of trees is constructed based on a plurality of images of the front side of the row of trees and a three-dimensional model of a back side of the row of trees is constructed based on a plurality of images of the back side of the row of trees. Front trunk points in the three-dimensional model of the front side that belong to a trunk of a tree and back trunk points in the three-dimensional model of the back side that belong to the trunk of the tree are identified. The front trunk points and the back trunk points are used to align the three-dimensional model of the front side with the three-dimensional model of the back side.

In accordance with a still further embodiment, a computing device includes a memory containing front side image frames and back side image frames for an orchard row. A processor executing instructions, performs steps that include constructing a three-dimensional model of a front side of the orchard row from the front side image frames and constructing a three-dimensional model of a back side of the orchard row from the back side image frames. A front trunk descriptor is identified from the three-dimensional model of the front side and a back trunk descriptor is identified from the three-dimensional model of the back side. The front trunk descriptor and the back trunk descriptor are then used to align the three-dimensional model of the back side with the three-dimensional model of the front side.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

There are many techniques such as Structure from Motion (SfM) or RGB-D SLAM [S. Agarwal, K. Mierle, et al., "Ceres solver," 2012], [J. Sturm, N. Engelhard, F. Endres, W. Burgard, and D. Cremers, "A benchmark for the evaluation of rgb-d slam systems," in *Intelligent Robots and Systems* (*IROS*), 2012 *IEEE/RSJ International Conference on*. IEEE, 2012, pp. 573-580] which can generate reconstructions of individual sides of the rows. However, existing methods cannot merge these two reconstructions: Even with the manual selection of correspondences, Iterative Closest Point (ICP) techniques fail.

Large-scale SfM techniques can produce consistent reconstructions with the presence of overlapping side views or with loop closure. Obtaining such views in orchard settings is hard because the rows can be extremely long (sometimes spanning a thousand meters or more). The use of very precise Real-Time Kinematic (RTK) GPS can be used to solve the registration problem, but it is costly and not always available.

In the embodiments provided below, reconstructions from both sides of a row of trees are merged without the need for overlapping views or GPS coordinates. In a first embodiment, this is achieved by finding a rigid body transformation between the occlusion boundaries of a fronto-parallel view and then estimating a single overlapping depth distance using 2D shape matching methods and semantic constraints (e.g. the tree trunks are well approximated by cylinders, their projection in a side view and front view have the same width). In a second embodiment, semantic relationships between each of the two-sides are established and tree morphology is integrated into the reconstruction system, which in turn outputs optimized morphological parameters.

Problem Formulation and Overview of Technical Approach

Consider a row of trees in an orchard. Suppose an imaging device moves along one side of the row (which we arbitrarily call the "front side") and captures images. Then it moves to the "back" side and captures a second set of images. The images can be standard RGB images or they may also include depth information. The images in each set are used to obtain two independent reconstructions represented as point clouds. The main problem we address is to merge these two reconstructions by computing the scale, rotation and translation to align them. The problem is formalized as follows:

Problem Definition: Given two sets of input images $\{^F I_i, {}^F I_j\}$ from the front and back sides of a row, two reconstructions {F, B} of $\{^F I_i, {}^B I_j\}$ along with extrinsic camera poses $\{^F T_i, {}^B T_j\}$ where i=1, . . . , m and j=1, . . . , n of each image, the goal is to merge these two reconstructions into a single coherent model $^3\mathcal{P}$ with combined set of camera poses {T} by finding a transformation $\{_B^F T = s[_B^F \mathcal{R} |_B^F t]\}$ that merges the back side reconstruction with the front.

System

Figure 1:
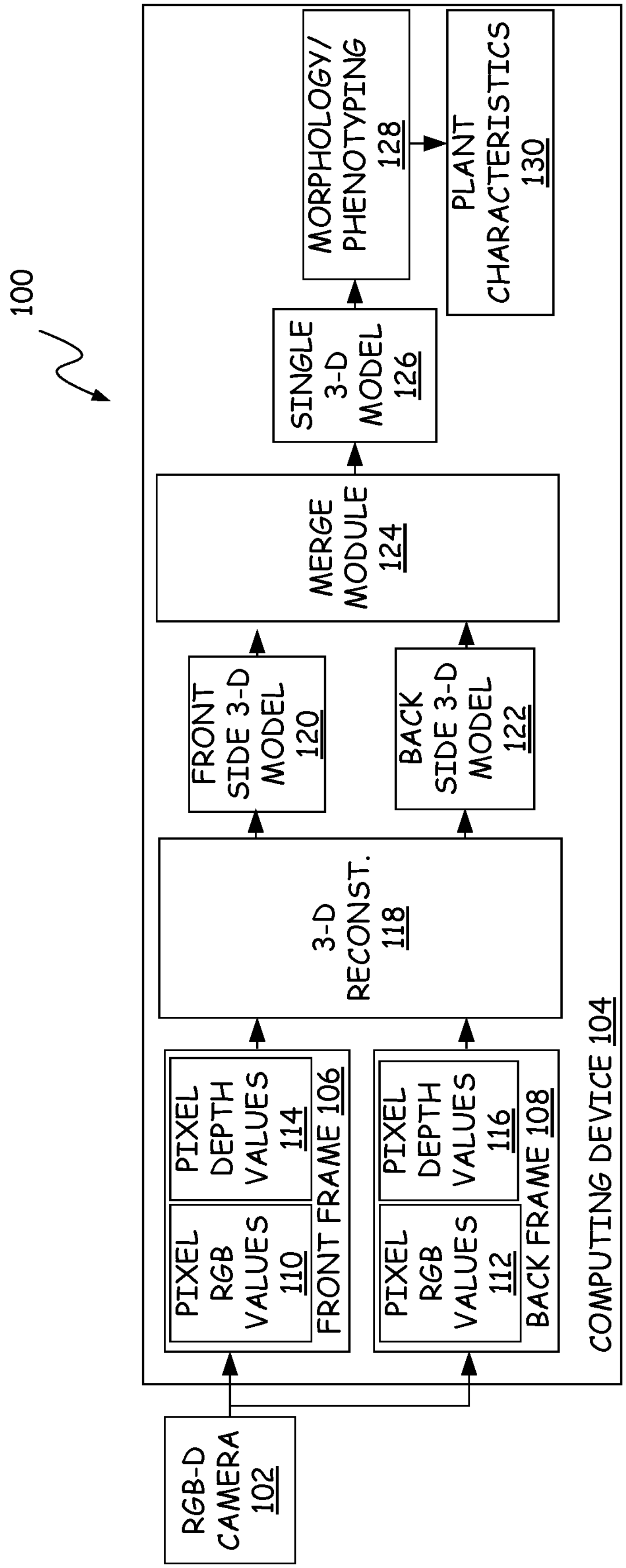
FIG. 1 provides a block diagram of elements used to identify plant characteristics from RGB-D images in accordance with various embodiments. is a front view of an apple tree.

FIG. 1 is a block diagram of a system in accordance with one embodiment. System 100 includes a camera 102 and a computing device 104. In accordance with one embodiment, camera 102 is in the RGB-D camera, which provides both pixel RGB values and pixel depth values. In particular, camera 102 provides fames of images for the front of a row of trees designated as front frames 106 and frames of pixel values for the back of a row trees labeled back frames 108. Each frame contains RGB values for each pixel, such as pixel RGB values 110 and 112 as well as pixel depth values, such as pixel depth values 114 and pixel depth values 116, which indicate the relative depth of each pixel in the image. Front frames 106 and back frames 108 are provided to a 3D reconstruction module 118, which uses front frames 106 to construct a front side 3D model 120 and uses back frames 108 to construct a back side 3D model 122 representing a 3D reconstruction of the front side of a row of trees and a separate 3D reconstruction of a back side of the same row of trees, respectively.

In accordance with one embodiment, the reconstructions each begin with finding a relative rigid transformation between each pair of frames by applying a RANSAC-based three-point-algorithm [David Forsyth and Jean Ponce. *Computer vision: a modern approach*. Upper Saddle River, N.J.; London: Prentice Hall, 2011] on the SIFT matches [David G Lowe. Distinctive image features from scale-invariant keypoints. *International journal of computer vision,* 60(2):91-110, 2004] with valid depth values. Pairwise Bundle Adjustment (BA) is performed to optimize the relative transformation and 3D locations of matches by minimizing 2D reprojection errors. For loop detection, we build a Bag of Words (BoW) model [Josef Sivic and Andrew Zisserman. Efficient visual search of videos cast as text retrieval. *IEEE transactions on pattern analysis and machine intelligence,* 31(4):591-606, 2009] to characterize each frame with a feature vector, which is calculated based on different frequencies of visual words. The score matrix is obtained by computing the dot products between all pairs of feature vectors. Possible loop pairs are first selected by a high score threshold and then tested by RANSAC-based pose estimation whether a reasonable number of good matches are obtained (e.g. 100 SIFT matches). Loop pairs are thus accurately detected and linked with pairs of consecutive frames by a covisibility graph. Loop detection allows us to capture each single tree back and forth from different views on a single side.

For each frame in consecutive pairs, we first perform local BA to optimize its local frames which have common features. To effectively close the loop, pose graph optimization [Hauke Strasdat, J M M Montiel, and Andrew J Davison. Scale drift-aware large scale monocular slam. *Robotics: Science and Systems VI,* 2, 2010] is then performed followed by global BA to finally optimize all camera poses and 3D points. Given the fact that depth maps in outdoor cases are generated by infrared stereo cameras, we integrate 3D errors information into the objective function of bundle adjustment as follows:

$$\underset{R_c, t_c, X_p}{\operatorname{argmin}} J \sum_c \sum_{p \in V(c)} \rho(E_o(c, p)) + \rho(E_i(c, p)) \tag{1}$$

$$E_o(c, p) = \|{}^c\overline{X}_p - K_o[R_c \mid t_c]X_p\|^2$$

$$E_i(c, p) = \|K_i[R_i \mid t_i]{}^c\overline{X}_p - K_i[R_i \mid t_i][R_c \mid t_c]X_p\|^2$$

where ρ is the robust Huber cost function [Peter J Huber. Robust estimation of a location parameter. In *Breakthroughs in statistics*, pages 492-518. Springer, 1992], $K_o$ and $K_i$ are intrinsics matrices of the RGB camera and the left infrared camera, $[R_i|t_i]$ is the relative transformation between these two cameras, $[R_c|t_c]$ is the RGB camera pose, $X_p$ is the 3D location of a point visible from the camera frame c, and $^c\overline{X}_p$ and $^c\overline{X}_p$ are the observed 2D feature and 3D location in the RGB camera frame, respectively.

A merge module 124 merges front side 3D model 120 with back side 3D model 122 to provide a single 3D model 126. The single 3D model 126 is then provided to a morphology/phenotyping module 128, which identifies various physical attributes 130 of individual trees in the row of trees including, for example, trunk size, number of fruit, canopy volume, and tree height.

Two alternative embodiments are provided for implementing merge module 124 with one embodiment using a combination of Primary Component Analysis, occlusion boundary alignment and tree trunk alignment to merge the front and back models and the other embodiment modeling tree trunks in the front and back models as cylinders and jointly aligning the cylinders and local ground planes in the front and back models.

First Embodiment of Merge Module

Figures 2A, 2B:
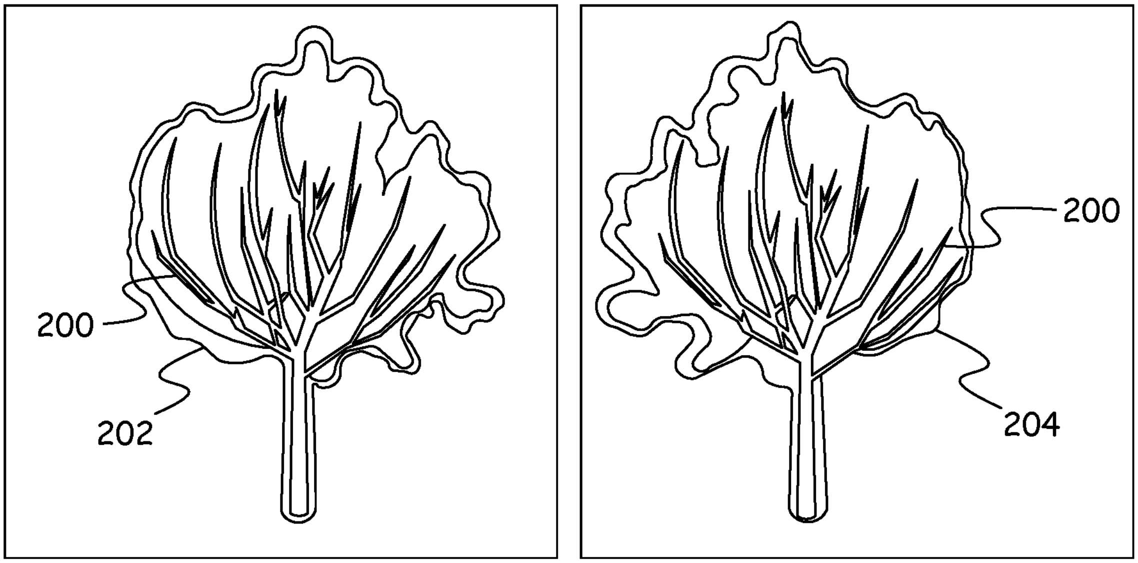
FIG. 2A shows a silhouette of an apple tree from the front side.
FIG. 2B shows a silhouette of the apple tree from the back side.

The front-side and back-side reconstructions F, B generally do not share any local feature matches (point correspondences). To constrain the system, this embodiment assumes that the occlusion boundary of an object from the front and back orthographic views should be nearly the same after rotating the back orthographic view to align with the front orthographic view. For example, FIG. 2A shows a front orthographic view of a tree 200 and FIG. 2B shows a back orthographic view of tree 200 where the line of sight of the two views are parallel to each other but in opposite directions. The views of FIGS. 2A and 2B each have a respective occlusion boundary 202 and 204 that represent the outer boundary of the parallel projections of the points in the views on the XY plane. As shown, if occlusion boundary 204 is rotated 180 degrees around a vertical axis, it becomes similar to occlusion boundary 202. The occlusion boundaries of this view can be approximated by the well-known concept of alpha shapes [H. Edelsbrunner and E. P. Mücke, "Three-dimensional alpha shapes," *ACM Transactions on Graphics* (*TOG*), vol. 13, no. 1, pp. 43-72, 1994]. An alpha hull is the generalized version of the convex hull. The boundaries of an alpha hull $\alpha_{bnd}$ are point pairs that can be touched by an empty disc of radius alpha, such that the hull becomes more detailed as alpha decreases.

This embodiment also assumes that tree trunk segments at the same height from two sides can be treated approximately as cylinders. When projected to the ground plane they share the same center of the elliptical shape. If the median planes of the detected trunks in the front and back reconstructions are aligned, the maximum depth alignment error is bounded by the trunk widths. In most orchard settings, there are no leaves/branches attached to the trunks near the ground plane and the number of 3D points in this region are very sparse. We can use this observation to cluster the 3D points belonging to tree trunks.

Based on these assumptions, the embodiment aligns the back reconstruction to the front reconstruction by solving the following minimization problem:

$$s^*, {}_B^F R^*, {}_B^F t^* = \underset{s,\, {}_B^F R,\, {}_B^F t}{\operatorname{argmin}} dist(\alpha_{bnd}(P_{xy} \cdot F), \alpha_{bnd}(P_{xy} \cdot {}_B^F T \cdot B)) + dist(P_{zx} \cdot F_{tr}, P_{zx} \cdot {}_B^F T \cdot B_{tr}), \quad (2)$$

where s is a scale applied to the back reconstruction B to match the scale of the front reconstruction F, ${}_B^F R$ is a rotation applied to the back reconstruction to align it with the front reconstruction, ${}_B^F t$ is a translation applied to the back reconstruction to align it with the front reconstruction, ${}_B^F T$ is the combination of scale, rotation and translation applied to the back reconstruction, $F_{tr}$ and $B_{tr}$ denote the detected trunk points close to the median trunk plane, $P_{xy}$ and $P_{xz}$ denote the orthogonal projection matrix to the front and top plane, respectively, $\alpha_{bnd}$ computes the alpha shape boundary points and dist ($\mathcal{P}$, Q) between two point sets $\mathcal{P}$, Q in $\mathbb{R}^D$ is determined as:

$$dist(\mathcal{P}, Q) = \sum_{\forall p \in \mathcal{P}} \min_{\forall q \in Q} (p - q)^2 \quad (3)$$

Figure 3:
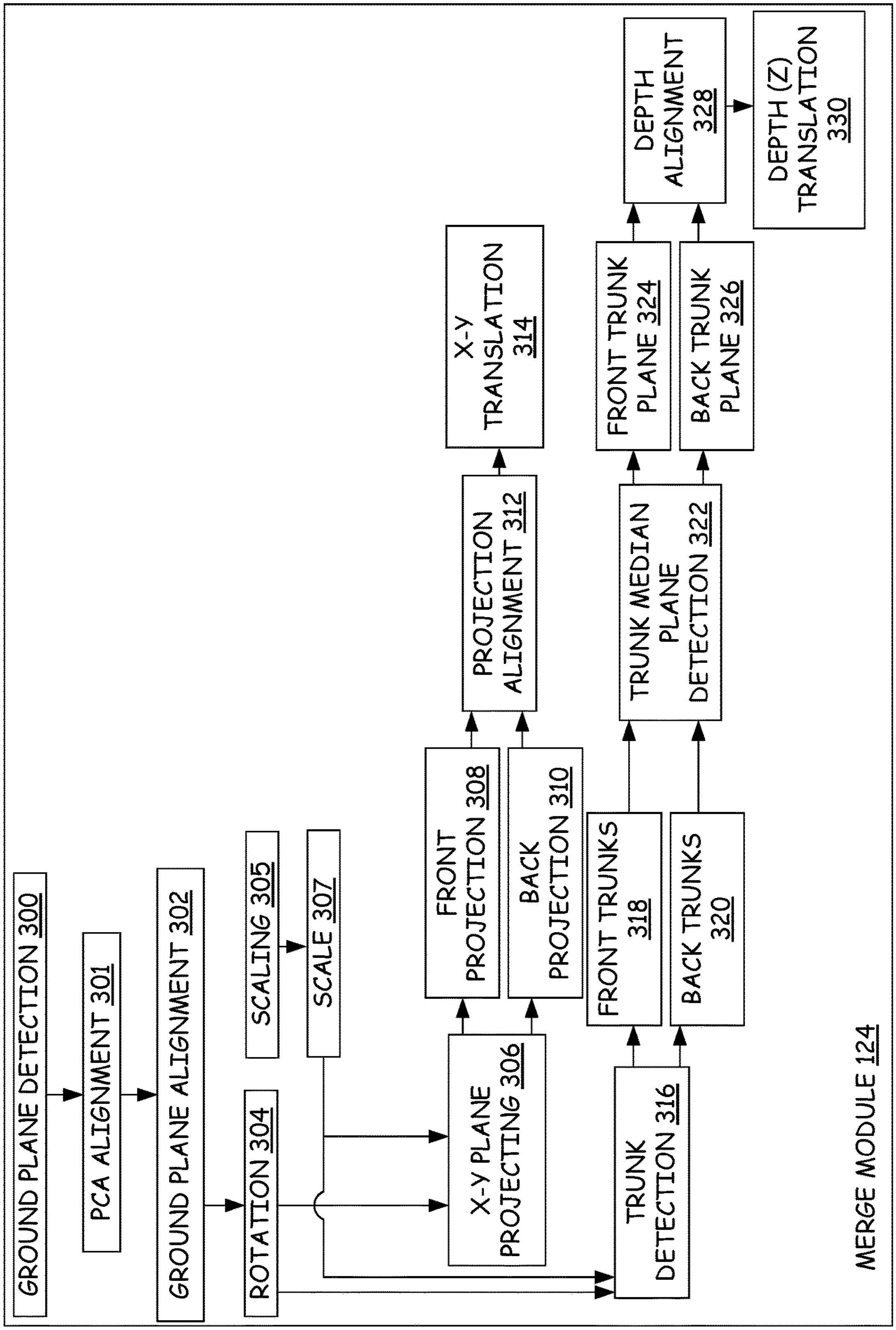
FIG. 3 provides a block diagram of elements used to merge front and back reconstructions in accordance with a first embodiment.

In this embodiment, merge module 124 solves Eq. (2) using trusted region methods such as Levenberg-Marquardt (LM) algorithm [J. J. Moré, "The levenberg-marquardt algorithm: implementation and theory," in Numerical analysis. Springer, 1978, pp. 105-116] using an initial solution that is identified using Principal Component Analysis and ground plane alignment. FIG. 3 provides a block diagram of elements that make up merge module 124 in accordance with this embodiment.

In FIG. 3, merge module 124 includes a ground plane detection module 300 that detects the ground plane in both front side 3D model 120 and back side 3D model 122. The normals of the identified ground planes are provided to a PCA alignment module 301, which performs a principle component analysis on both front side 3D model 120 and back side 3D model 122 to identify the principle axes in both front side 3D model 120 and back side 3D model 122. These principle axes are then aligned by determining rotations that need to be applied to the principle axes of back side 3D model 122 to make them parallel with the principle axes of front side 3D model 120. During this alignment, PCA alignment module 301 uses the ground plane normal and the camera poses identified during the formation of front side 3D model 120 and back side 3D model 122 to determine the depth and up direction of the PCA components.

To further align front side 3D model 120 and back side 3D model 122, a ground plane alignment 302 determines rotations necessary to align the normals to the ground planes of front side 3D model 120 and back side 3D model 122. The combined rotations produced by PCA alignment 301 and ground plane alignment 302 produces rotation 304 needed to align front side 3D model 120 with back side 3D model 122.

A scaling module 305 determines a scale transformation 307 to apply to back-side 3D model 122 based on the median scene height of the image frames and fixes the height of the ground plane using the median height of ground plane inliers.

An x-y plane projecting module 306 then projects both front side 3D model 120 and rotated and scaled back side 3D model 122 on to an x-y plane. This results in a front projection 308 and a back projection 310. The outlines of these projections are then aligned by projection alignment module 312 to produce an x-y translation 314 for aligning front side 3D model 120 with the back side 3D model 122. In accordance with one embodiment, projection alignment module 312 uses alpha volume analysis to compute the occlusion boundary and 2D shape matching techniques [A. Myronenko and X. Song, "Point set registration: Coherent point drift," IEEE transactions on pattern analysis and machine intelligence, vol. 32, no. 12, pp. 2262-2275, 2010] to compute the translation in the x-y plane.

Front side 3D model 120 and rotated and scaled back side 3D model 122 are also provided to a trunk detection module 316, which examines the 3D models to identify front trunks 318 identified from front side 3D model 120 and back trunks 320 identified from back side 3D model 122 using a trunk detection method described below. A trunk median plane detection module 322 then uses the median position of the trunks to define a median front trunk plane 324 and a median back trunk plane 326. A depth alignment module 328 then identifies a depth (z) translation that will align the back trunk plane 326 with the front trunk plane 324 and thereby link front trunks 318 to back trunks 320 resulting in depth translation 330. Together, depth translation 330, x-y translation 314, scale 307 and rotations 304 provide a transformation matrix that is applied to back side 3D model 122 to align it with front side 3D model 120.

After these steps, the point clouds are roughly aligned and the trivial initial solution s=1, ${}_{B}^{R}R=I_{3\times3}$, ${}_{B}^{F}t=0_{3\times1}$ leads to convergence. This method does not compute the trunk overlap distance precisely. However, it provides correspondence between the trunks from both side. Using the Random Sample Consensus (RANSAC) [M. A. Fischler and R. C. Bolles, "Random sample consensus: a paradigm for model fitting with applications to image analysis and automated cartography," *Communications of the ACM*, vol. 24, no. 6, pp. 381-395, 1981] scheme, the trunk and the ground area around each tree are modeled as a cylinder and a plane, respectively. This semantic information, i.e., trunks and ground areas, can be exploited into the bundle adjustment to further eliminate misalignment of two-sides reconstructions by adjusting camera poses and 3D information of semantic objects and feature points.

We describe each of these steps in details. We start with the initial step of PCA and ground plane alignment.

Ground Plane Estimation and Alignment Using PCA

The main goal of this step is to eliminate most of the rotational difference required to align the two reconstructions. As is well known, this is normally solved by Principle Component Analysis (PCA). We assume that the length of the portion of the row covered by the input reconstruction is always longer than the height of the trees and the depth captured. Therefore, the first principle component always denotes the length of the row covered. The other two principle components though vary from reconstruction to reconstruction. Therefore, while aligning the principal components we need to be aware of which principle component denotes scene depth and which one denotes height.

To automatically figure out the scene "up" and "depth" directions we estimate the ground plane. We perform a simple three-point RANSAC method for plane estimation [M. Y. Yang and W. Forstner, "Plane detection in point cloud data," in *Proceedings of the* 2*nd int conf on machine control guidance*, Bonn, vol. 1, 2010, pp. 95-104]. Afterward, we align the corresponding principal components. If necessary, we flip the depth direction of one of the reconstructions to ensure that the frontal depth planes are opposing each other. Afterwards, we align the ground plane normals and rotate the point clouds to a canonical frame of reference (X, Y, Z) where $X=[1, 0, 0]^T$, $Y=[0, 1, 0]^T$ (up direction) and $Z=[0, 0, 1]^T$ (depth direction). Next, we fix the scale of the reconstructions using the maximum and minimum height of the trees and fix the height of the ground plane using inliers. The reconstructions are now roughly aligned in terms of rotation and translation in Y direction.

Alignment of Orthographic Projection Boundaries

In the last section, we roughly aligned the two reconstructions in terms of rotation, scale and, translation with respect to the ground plane. Now we have to estimate translation in the canonical direction $X=[1, 0, 0]^T$ and $Z=[0, 0, 1]^T$. We start with solving for the translation in X direction. In practice, reconstructions are not perfect, and the ground plane is not perfectly planar. Consequently, our estimation in the previous step contains some error in terms of rotation, scale and translation in X and Y-directions. We use a method that computes this residual rotation, translation and scaling along with the translation in the X direction.

As outlined above, to solve this we utilize the occlusion boundary of the reconstructions from orthographic front views. We use alpha volume analysis to compute the occlusion boundaries. The alpha hull boundaries are basically a set of 2D points. Thus, essentially we are solving a 2D point set registration problem. As our alpha boundaries are noisy we use a shape alignment method, Coherent Point Drift algorithm (CPD) [A. Myronenko and X. Song, "Point set registration: Coherent point drift," *IEEE transactions on pattern analysis and machine intelligence*, vol. 32, no. 12, pp. 2262-2275, 2010.]. Myronenko et. al cast the point set registration problem as a probability density estimation problem. They represent one of the input point set as the centroids of a Gaussian Mixture Model (GMM) [C. E. Rasmussen, "The infinite gaussian mixture model," in *Advances in neural information processing systems,* 2000, pp. 554-560] and the other input as data. For the rigid transformation case, they reparameterize the GMM centroids in terms of rotation transformation and scale. They estimate the parameters by minimizing the negative log likelihood using the Expectation Maximization algorithm [Y. Zhang, M. Brady, and S. Smith, "Segmentation of brain mr images through a hidden markov random field model and the expectation-maximization algorithm," *IEEE transactions on medical imaging*, vol. 20, no. 1, pp. 45-57, 2001]. Additionally, they add an extra component in the GMM to account for noise and outliers. At the optimum value of the parameters, two point sets are aligned. We apply the transformation computed by CPD to the entire point cloud to align them in the XY directions.

Alignment in Depth Direction Using Trunk Information

The principle ambiguity left is the relative depth distance between the two reconstructions. In an orchard row, trees are generally planted in straight lines and tree trunks are perpendicular to the ground. Therefore, we can imagine the existences of a central trunk plane bisecting the trunks. For each individual reconstruction, this bisector plane can be approximated by the median depth-plane of the detected trunks and we can align the reconstructions roughly by aligning the points close to this median plane.

Figure 4:
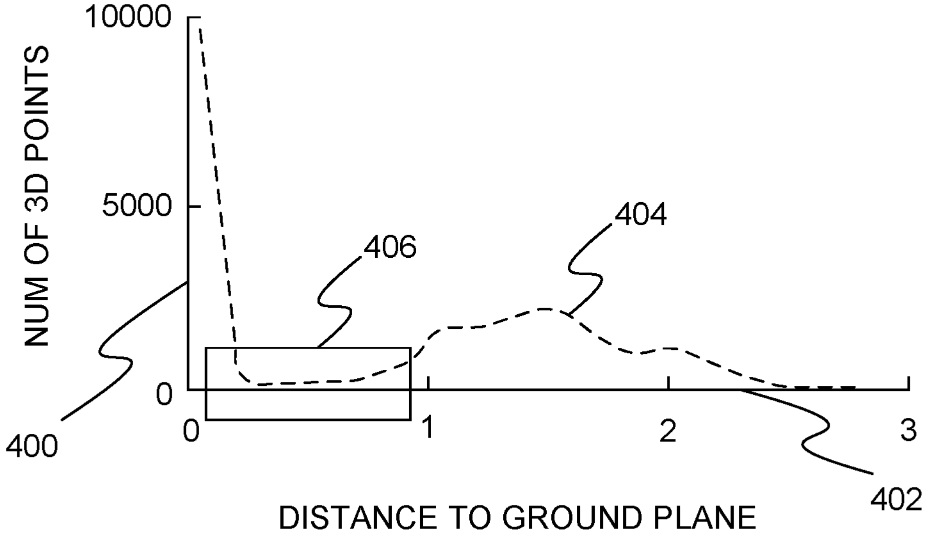
FIG. 4 shows a graph illustrating trunk detection.

Trunk Detection: In most orchard settings, there are no leaves/branches attached to the trunks near the ground plane. Consequently, the number of 3D points in the trunk region close to the ground is very small. This is shown in FIG. 4, which provides a graph 404 of the number of 3D points in the 3D reconstruction (shown along vertical axis 400) at different distances from the ground plane (shown along horizontal axis 402). Flat region 406 of graph 404 represents the trunk region and is easily identified by the utilizing the derivative of a curve describing graph 404. The region with the minimum number of points and two knee points around it is used to find the trunks close to the ground.

A median filtering of the trunk points ${}^{3}F_{tr}$, ${}^{3}B_{tr}$ is performed to identify front trunk descriptors in the form of trunk points along a front median plane and to identify back trunk descriptors in the form trunk points along a back median plane. Afterward, the trunk points of the front median plane and trunk points of the back median plane are aligned using Coherent Point Drift (CPD) method [A. Myronenko and X. Song, "Point set registration: Coherent point drift," *IEEE transactions on pattern analysis and machine intelligence*, vol. 32, no. 12, pp. 2262-2275, 2010].

After this step, both the reconstructions are in the same frame of reference and they have a very small difference in terms of rotation, translation, and scale. The trivial initial solution of s=1, ${}_{B}^{F}R=I_{3\times3}$, ${}_{B}^{F}t=0_{3\times1}$ leads to fast convergence. As a byproduct from this process, a trunk to trunk correspondences has been established between the two reconstructions. This correspondence is then used to perform semantic bundle alignment as discussed next.

Semantic Bundle Adjustment

Given a height interval from the estimated ground plane, the trunk slice can be treated as a cylinder from two-sides reconstructions, which can be parameterized by its axis, center and radius. Without loss of generality, the local ground area of a tree is assumed as a plane defined by its normal and center. To eliminate the misalignment of two-sides reconstructions, the initial transformation is first calculated using such semantic information, i.e., tree trunks and ground areas around each tree. To address the issue of accumulated errors of camera poses, two-sides 3D reconstructions after initial alignment need to be further optimized by minimizing the cost of the semantic bundle adjustment $$\underset{R_c, t_c, R_s, t_s, X_p}{\operatorname{argmin}} J' = J \sum_s \sum_c \sum_{p \in V(s,c)} \rho(\lambda_s E_b(s, c, p)), \tag{4}$$

$$E_b(s, c, p) = \phi_l([R_s \mid t_s][R_c \mid t_c]^{-1\,c}\overline{X}_p, b_s)^2$$

where $\phi_l$ (l=0,1) is the loss function of the distance between an s-th object and observed points belongs to it, J is the cost function for the standard bundle adjustment [B. Triggs, P. F. McLauchlan, R. I. Hartley, and A. W. Fitzgibbon, "Bundle adjustment modern synthesis," in *International workshop on vision algorithms*. Springer, 1999, pp. 298-372], ${}^c\overline{X}_p$ is the p-th observed 2D feature and its 3D location in the c-th camera frame, ρ is the robust Huber cost function, and the weight $\lambda_s$ balances between the cost J of feature points and the cost of semantic object points. See our technical report [W. Dong and V. Isler, "Tree morphology for phenotyping from semantics-based mapping in orchard environments," Technical Report TR-18-0XX, University of Minnesota, Computer Science & Engineering Department, Tech. Rep., 2018], which is hereby incorporated by reference.

Second Embodiment of Merge Module

Figure 5:
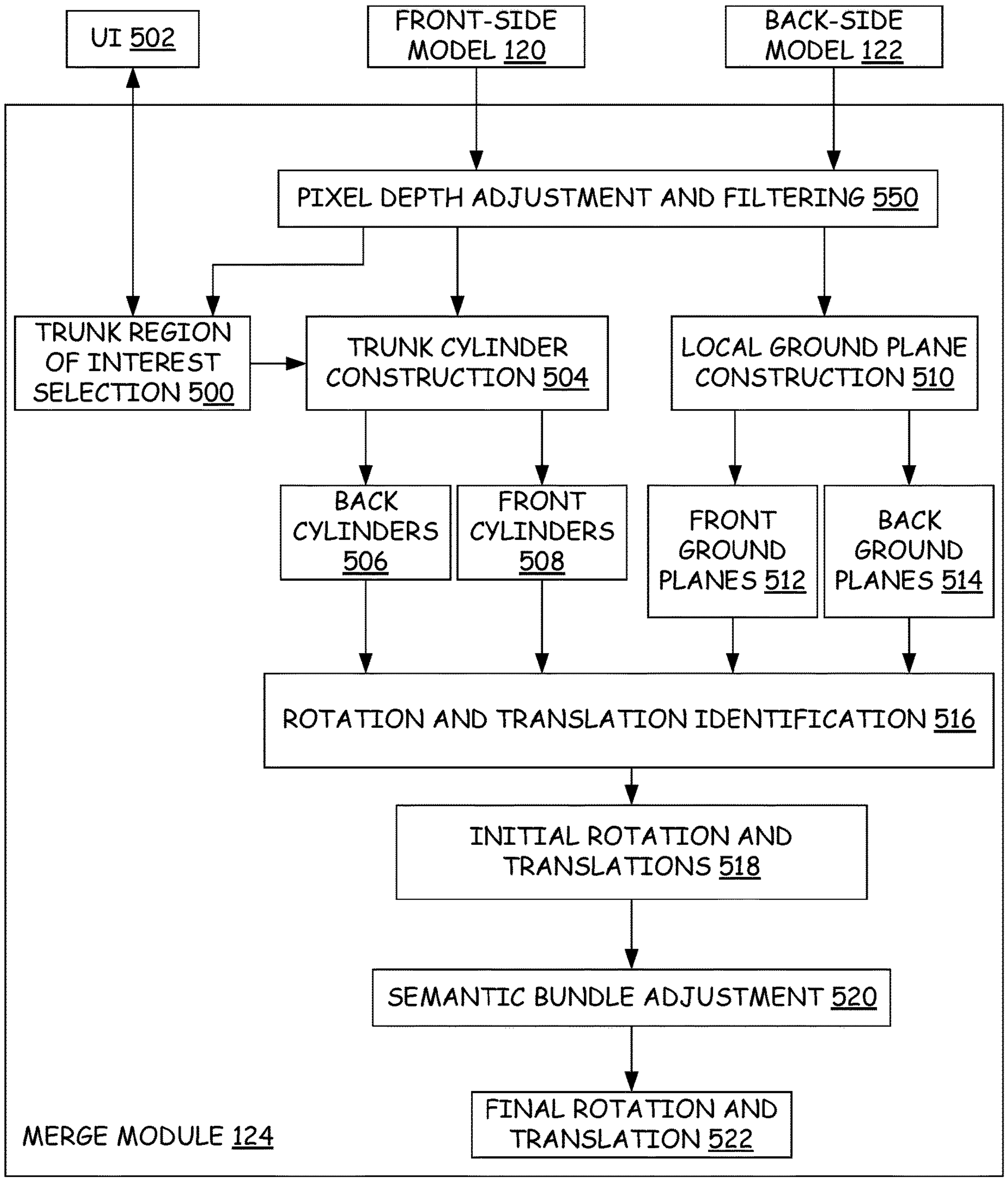
FIG. 5 provides a block diagram of elements used to merge front and back reconstructions in accordance with a second embodiment.

FIG. 5 provides a block diagram of elements of merge module 124 in accordance with the second embodiment.

Trunk Fitting and Local Ground Estimation

Accurate geometry estimation relies on good depth maps. The raw depth maps are usually noisy, especially in orchard environments. The big uncertainty of depth values around frequent occlusions between trees and leaves causes generated 3D points floating in the air. Merge module 124 first improves the depth map of front-side model 120 and back-side model 122 using a pixel depth adjustment and filtering module 550. In accordance with one embodiment, pixel depth adjustment and filtering module 550 uses a Truncated Signed Distance Function (TSDF) [Brian Curless and Marc Levoy. A volumetric method for building complex models from range images. In *Proceedings of the 23rd annual conference on Computer graphics and interactive techniques*, pages 303-312. ACM, 1996] to accumulate depth values from nearby frames (e.g. 10 closest frames) with the camera poses obtained during the formation of front-side model 120 and back-side model 122. The pixel value of the raw depth is ignored if it is largely different from the corresponding value in the fused depth obtained by ray casting. A floating pixel removal filter [Soheil Sotoodeh. Outlier detection in laser scanner point clouds. *International Archives of Photogrammetry, Remote Sensing and Spatial Information Sciences*, 36(5):297-302, 2006] is further applied to eliminate any pixel of the raw depth that has no nearby 3D points within a certain distance threshold.

Trunk Region-of-Interest Selection: Horticulturists typically measure the trunk diameter of a fruit tree at the height about a first width above the graft union. Merge module 124 of FIG. 5 includes a trunk region of interest selection module 500, which produces a user interface 502 that allows a user to designate locations on trunks where the diameter of the trunk is to be measured.

Figure 6A:
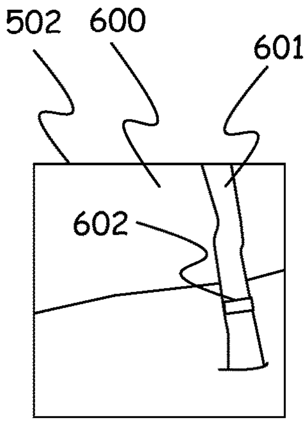
FIG. 6A shows application of a polygon to an RGB image during trunk annotation.
Figure 6B:
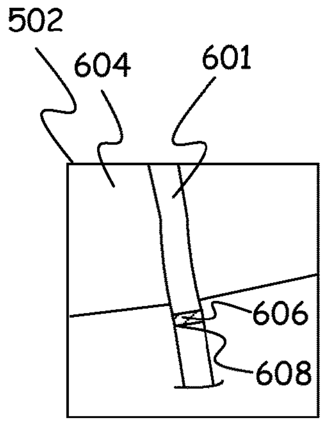
FIG. 6B shows the polygon of FIG. 6A projected onto a neighboring RGB image.
Figure 6C:
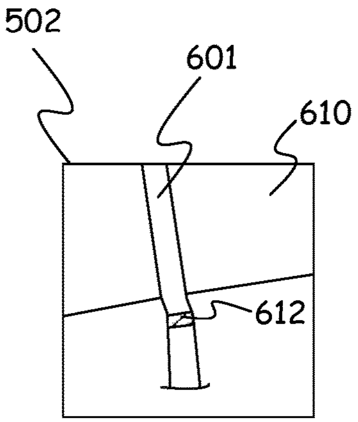
FIG. 6C shows the selected region of FIG. 6B applied to another image.

FIG. 6A provides an example of user interface 502 showing an image frame 600 of a tree trunk 601 that the user is able to annotate by defining and positioning a polygon 602 on top of a portion of tree trunk 600. 3D points of the 3D model that correspond to the pixels within polygon 602 of this frame are then projected to the next image frame c+1. As shown in FIG. 6B, a second image 604 is then produced in user interface 502 showing the next frame c+1 with the projected pixels 606 highlighted and enclosed by a convex polygon 608. If convex polygon 608 does not include all of the desired region of the tree trunk or if convex polygon 608 includes pixels outside of the desired region, the user modifies convex polygon 608 in second image 604 so that it accurately covers the desired region. The new annotated polygon is updated to create projected regions for the following frames. For example, in FIG. 6C, user interface 502 shows a third image 610 having a highlighted projected region 612. The nearby frames usually have correct projected regions and are thus skipped without any annotation. The trunk annotation can be replaced by trunk detection if there is no need for an exact diameter estimation.

Trunk Cylinder: Using the identified regions, a trunk cylinder construction module 504 identifies back trunk descriptors and front trunk descriptors in the form of back cylinders 506 and front cylinders 508 from the back side 3D model 122 and the front side 3D model 120, respectively. Each cylinder in back cylinders 506 and front cylinders 508 includes a radius of the cylinder, an axis of the cylinder and an origin for the cylinder representing the intersection of the axis with the bottom of the cylinder.

Specifically, for annotated frames, a 3D point cloud of the trunk in frame c is generated and filtered by taking the intersection of polygon masks with two nearby frames c−1 and c+1. The 3D points are then fit to a cylinder d parameterized by its axis ${}^c n_d$, center ${}^c O_d$ and radius ${}^c r_d$. The height ${}^c h_d$ of the cylinder is determined by a bounding box of 3D points along ${}^c n_d$.

A good cylinder model should not only fit most of the 3D points but also obtain a reasonable size from the image. To robustly model the cylinder, 2D constraints are integrated into a RANSAC scheme [Martin A Fischler and Robert C Bolles. Random sample consensus: a paradigm for model fitting with applications to image analysis and automated cartography. *Communications of the ACM*, 24(6):381-395, 1981] with the nine-point algorithm [Christian Beder and Wolfgang Forstner. Direct solutions for computing cylinders from minimal sets of 3d points. *Computer Vision—ECCV* 2006, pages 135-146, 2006]. Specifically, Canny edge detection [John Canny. A computational approach to edge detection. *IEEE Transactions on pattern analysis and machine intelligence*, (6):679-698, 1986] is first performed. Based on the silhouette of the annotated polygon, two trunk boundaries are detected and fitted to lines $l_a$ and $l_b$ using the total least squares method [Gene H Golub and Charles F Van Loan. An analysis of the total least squares problem. *SIAM Journal on Numerical Analysis*, 17(6):883-893, 1980]. Two cylinder boundaries $l_\alpha$ and $l_\beta$ are extracted by projecting the circles of two cylinder ends onto the image. The trunk cylinder in frame c is further optimized by minimizing the cost function $$\underset{{}^c n_d,\, {}^c o_d,\, {}^c r_d}{\operatorname{argmin}} \sum_p e_d^2({}^c X_p, d) + \lambda\left(\left\|\hat{1}_\alpha - \hat{1}_a\right\|^2 + \left\|\hat{1}_\beta - \hat{1}_b\right\|^2\right), \tag{5}$$

where $e_d$ is the distance function of a 3D point ${}^c X_p$ to the cylinder, and $\hat{1}_\alpha$, $\overline{1}_\beta$, $\hat{1}_a$, and $\hat{1}_b$ are normalized unit vectors.

Local Ground Plane: A local ground plane construction module 510 identifies one or more front ground planes 512 from front side 3D model 120 and one or more back ground planes 514 from back side 3D model 122. Without loss of generality, the local ground of a tree is assumed as a plane defined by its normal ${}^c n_p$ and center ${}^c O_p$ in frame c. Unlike trunk annotation, only frame number is recorded for plane estimation. However, it is not always the case that the majority of 3D points are from the ground, which highly depends on the scene and the camera view. The standard RANSAC-based method fails to detect the ground plane so ground plane construction module 510 modifies the degenerate condition of the RANSAC by using the prior information of the trunk axis ${}^c n_d$ transformed from the closest annotated frame: ${}^c n_p$ should roughly align with ${}^c n_d$, and the estimated plane should be on the boundary of all 3D points along ${}^c n_p$ within the distance threshold $t_s$. The local ground in frame c is thus defined by the plane normal ${}^c n_p$ and the origin ${}^c O_p$. Local ground estimation from the front side can further help annotations for the back side.

Rotation and Translation

For a tree row, front-side model 120 and back-side model 122 are expressed in their own frames F and B, respectively. The goal is to first align the two models by estimating the initial transformation $[{}_B^F R|{}_B^F t]$, and further optimize the 3D reconstruction based on semantic information.

Initial Transformation: A rotation and translation identification model 516 uses back cylinders 506, front cylinders 508, front ground planes 512 and back ground planes 514 to identify rotations and translations 518 that will jointly minimize the angle offset between the axes of front and back cylinders for a same trunk, the lateral displacement of the origins of the front and back cylinders for a same trunk, and the vertical displacement of the origins of the same front and back ground planes.

From a geometric view, to align the 3D models of a tree row from both sides, at least two annotated trunks and one estimated local ground are required. 3D models are first constrained on the local ground plane. The translation and rotation along the ground plane are further constrained by two trunk-cylinders. Multiple trunks and local grounds can provide a robust solution. In the discussion of trunk fitting above, an i-th annotated trunk from two-sides annotated views is described by its cylinder axes ${}^F n_d^i$ and ${}^B n_d^i$ with a unit length, and its origins ${}^F O_p^j$ and ${}^B O_p^j$. Similarly, a j-th estimated local ground is described by its plane normal ${}^F n_p^j$ and ${}^B n_p^j$, and its origins ${}^F O_p^j$ and ${}^B O_p^j$.

First, cylinder axes and plane normals in B after the relative transformation must be equal to their corresponding ones in F. Then, the first two constraints have the form $$\begin{cases} {}_B^F R \cdot {}^B n_d^i = {}^F n_d^i \\ {}_B^F R \cdot {}^B n_p^j = {}^F n_p^j \end{cases} \tag{6}$$

where the first constraint links the front trunks to their respective back trunks.

Second, the origins of cylinders in B transformed to F should lie on the same axis-line. Then, the cross product between the cylinder axis and the difference of two-sides origins should be a zero vector $${}^F n_d^i \times ({}_B^F R \cdot {}^B O_d^i + {}_B^F t - {}^F O_d^i) = 0 \tag{7}$$

which also links the front trunks to the back trunks.

Lastly, the origins of local planes in B after the transformation to F must lie on the same plane. Thus, the dot product between the plane normal and the difference of two-sides origins should be zero $${}^F n_p^j \cdot ({}_B^F R \cdot {}^B O_p^j + {}_B^F t - {}^F O_p^j) = 0 \tag{8}$$

Following the order of constraints above, Eqs. 6-8 can be rearranged into a system of Ax=b by treating each element of $[{}_B^F R|{}_B^F t]$ as unknowns, where ${}^B n_d^i = [n_1^d, n_2^d, n_3^d]^T$, ${}^F n_d^i = [n'^d_1, n'^d_2, n'^d_3]^T$, ${}^B n_p^j = [n_1^p, n_2^p, n_3^p]^T$, and ${}^F n_p^j = [n'^p_1, n'^p_2, n'^p_3]^T$ for the axes, and the elements of origins have the similar form. Here, the matrix A and vector b are $$\begin{bmatrix} n_1^d & 0 & 0 & n_2^d & 0 & 0 & n_3^d & 0 & 0 & 0 & 0 & 0 \\ 0 & n_1^d & 0 & 0 & n_2^d & 0 & 0 & n_3^d & 0 & 0 & 0 & 0 \\ 0 & 0 & n_1^d & 0 & 0 & n_2^d & 0 & 0 & n_3^d & 0 & 0 & 0 \\ n_1^p & 0 & 0 & n_2^p & 0 & 0 & n_3^p & 0 & 0 & 0 & 0 & 0 \\ 0 & n_1^p & 0 & 0 & n_2^p & 0 & 0 & n_3^p & 0 & 0 & 0 & 0 \\ 0 & 0 & n_1^p & 0 & 0 & n_2^p & 0 & 0 & n_3^p & 0 & 0 & 0 \\ 0 & -n'^d_3 o_1^d & n'^d_2 o_1^d & 0 & -n'^d_3 o_2^d & n'^d_2 o_2^d & 0 & -n'^d_3 o_3^d & n'^d_2 o_3^d & 0 & -n'^d_3 & n'^d_2 \\ n'^d_3 o_1^d & 0 & -n'^d_1 o_1^d & n'^d_3 o_2^d & 0 & -n'^d_1 o_2^d & n'^d_3 o_3^d & 0 & -n'^d_1 o_3^d & n'^d_3 & 0 & -n'^d_1 \\ -n'^d_2 o_1^d & n'^d_1 o_1^d & 0 & -n'^d_2 o_2^d & n'^d_1 o_2^d & 0 & -n'^d_2 o_3^d & n'^d_1 o_3^d & 0 & -n'^d_2 & n'^d_1 & 0 \\ n'^p_1 o_1^p & n'^p_2 o_1^p & n'^p_3 o_1^p & n'^p_1 o_2^p & n'^p_2 o_2^p & n'^p_3 o_2^p & n'^p_1 o_3^p & n'^p_2 o_3^p & n'^p_3 o_3^p & n'^p_1 & n'^p_2 & n'^p_3 \end{bmatrix}, \tag{9}$$

$$[n'^d_1 \;\; n'^d_2 \;\; n'^d_3 \;\; n'^p_1 \;\; n'^p_2 \;\; n'^p_3 \;\; n'^d_2 o'^d_3 - n'^d_3 o'^d_2 \;\; n'^d_3 o'^d_1 - n'^d_1 o'^d_3 \;\; n'^d_1 o'^d_2 - n'^d_2 o'^d_1 \;\; n'^p_1 o'^p_1 + n'^p_2 o'^p_2 + n'^p_3 o'^p_3]^T$$

respectively, and $x = [r_1^T, r_2^T, r_3^T, {}_B^F t^T]^T$ with $r_1$, $r_2$ and $r_3$ as three columns of ${}_B^F R$.

We solve the system with multiple cylinders and planes for the least squares solution. The solution of ${}_B^F R$ may not meet the properties of an orthonormal matrix, but can be computed to approximate a rotation matrix by minimizing the Frobenius norm of their difference [Gene H Golub and Charles F Van Loan. *Matrix computations*, volume 3. JHU Press, 2012]. An accurate initial value can be obtained from an analytical solution by using the resultant of polynomials [Wenbo Dong and Volkan Isler. A novel method for extrinsic calibration of a 2-d laser-rangefinder and a camera. *arXiv preprint arXiv:*1603.04132, 2016]. With multiple pairs of cylinders and planes from both sides, we formulate an optimization problem $$\underset{{}_B^F R,\ {}_B^F t}{\operatorname{argmin}} \sum_i (\|e_1(i)\|^2 + |e_3(i)\|^2) + \sum_j (\|e_2(j)\|^2 + e_4^2(j)) \tag{10}$$

where $e_1$, $e_2$, $e_3$ and $e_4$ are residuals of Eqs. (6)-(8). The solution is further refined using the Levenberg-Marquard (LM) method [Kenneth Levenberg. A method for the solution of certain non-linear problems in least squares. *Quarterly of applied mathematics,* 2(2):164-168, 1944; Donald W Marquardt. An algorithm for least-squares estimation of nonlinear parameters. *Journal of the society for Industrial and Applied Mathematics,* 11(2):431-441, 1963] with the rotation represented by the Rodrigues formula [Olinde Rodrigues. *Des lois ge'ome' triques qui re' gissent les de' placements d'un syste`me solide dans l'espace: et de la variation des cordonne' es provenant de ces de'placements conside' re' s inde 'pendamment des causes qui peuvent les produire* . 1840].

Semantic Bundle Adjustment: To address the issue of accumulated errors of camera poses, two-sides 3D reconstructions after initial alignment need to be further optimized. In accordance with the embodiment, this optimization is performed by applying a semantic bundle adjustment 520 to initial rotation and translation 518 to produce final rotation and translation 522. Semantic bundle adjustment 520 uses semantic information, i.e. trunks and local grounds, integrated in a bundle adjustment to tune camera poses and 3D feature points until reasonable semantic conditions are reached. Specifically, two halves of a trunk from both sides should be well-aligned, and two-sides local grounds of a tree should refer to the same one. With semantic constraints, 3D points belonging to the same object are adjusted to fit onto the shape together with the camera poses corrected simultaneously.

Figure 7:
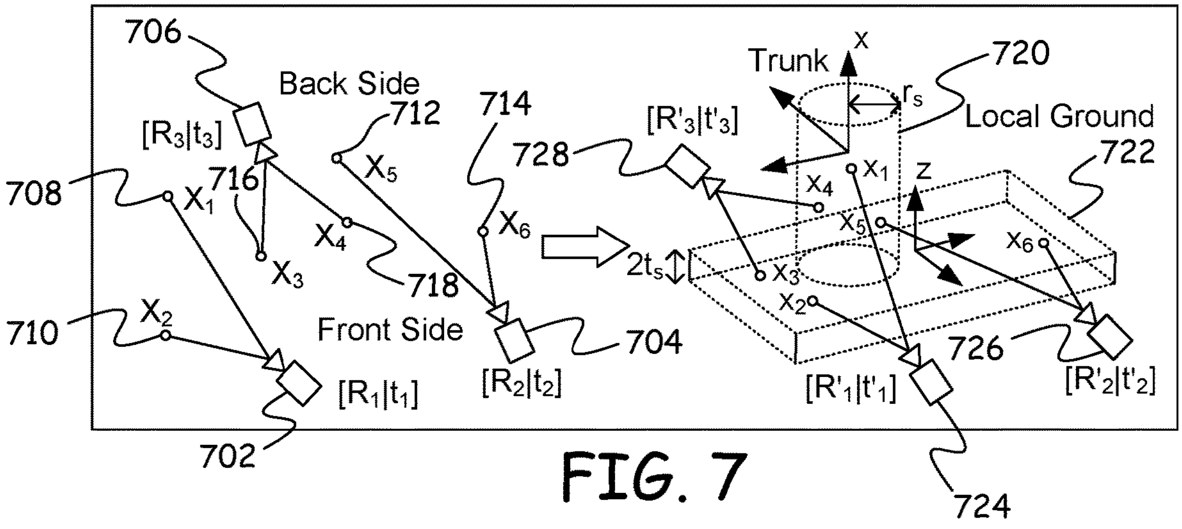
FIG. 7 shows modification to camera poses using semantic information about trunks and the ground plane.

For example, in FIG. 7(*a*) two front-side camera poses 702 and 704 and one back-side camera pose 706 are shown without semantic constraints. Camera poses 702, 704 and 706 are defined as $[R_1|t_1]$, $[R_2|t_2]$, and $[R_3|t_3]$, where R represents the rotation matrix and t the translation of the camera. Camera pose 702 captures 3D points 708 and 710, camera pose 704 captures 3D points 712 and 714 and camera pose 706 captures 3D points 716 and 718. Without semantic constraints, points 708-718 are permitted to be in any location and as a result, the camera poses are not constrained. However, with semantic constraints as shown in FIG. 7(*b*), points 708-718 are constrained to being located on semantic objects such as trunk cylinder 720 and ground plane 722 resulting in refined camera poses 724, 726 and 728 ($[R'_1|t'_1]$, $[R'_2|t'_2]$, and $[R'_3|t'_3]$) for initial camera poses 702, 704 and 706, respectively Technically, a semantic object with index s is characterized by its unique pose $[R_s|t_s]$ in the world frame and its 3D shape $b_s$. For a cylinder object, the shape is represented by its x-axis (as the cylinder axis), origin and a radius $r_s$. For a plane object, the shape is described by its z-axis (as the plane normal), origin and a threshold $t_s$ for bounding an interval along the plane normal. The cylinder radius $r_s$ and the plane-interval threshold $t_s$ are automatically determined by the fitting algorithms above. As a 3D feature point, the orientation $R_s$ and the position $t_s$ of an object are unknown and to be estimated by semantic bundle adjustment.

Given the correspondences of objects between two sides, the objective function of semantic bundle adjustment is as follows $$\underset{R_c,\, t_c,\, R_s,\, t_s,\, X_p}{\operatorname{argmin}} J' = J + \sum_s \sum_c \sum_{p \in V(s|,c)} \rho(\lambda_s E_b(s, c, p)) \tag{11}$$

$$E_b(s, c, p) = \emptyset_l([R_s \mid t_s][R_c \mid t_c]^{-1c}\overline{X}_p, b_s)^2$$

where $\emptyset_0(l=0)$ is the loss function for a plane object $\emptyset_0(X, b_s)=\|\max(x_3-t_s, 0, -x_3-t_s)\|$, and $\emptyset_1(l=1)$ is the loss function for a cylinder object $\emptyset_1(X, b_s)=\|\sqrt{x_2^2+x_3^2}-r_s\|$, with an input 3d point $X=[x_1, x_2, x_3]^T$.

The geometric meaning is that after transformation to the object frame, we penalize a 3D point belonging to a cylinder if it is far away from the cylinder surface. Similarly, a 3D point belonging to a plane is penalized if it is out of the boundary of the plane. The weight $\lambda_s$ balances between the cost J of feature points and the cost of semantic object points. In theory, we treat equally both a 3D feature point and an object. As the rotation is defined by its angle-axis, semantic BA is performed by using the LM method with automatic differentiation in Ceres Solver [Sameer Agarwal, Keir Mierle, et al. Ceres solver, 2012].

Measuring Tree Morphology

Trunk Diameter: The trunk diameter of each tree can be estimated from the second embodiment of merge module 124 using volumetric fusion of depth maps from all nearby frames. The 3D points of the trunk slice are extracted from 3D meshes based on the height to the ground that is determined from the annotated 3D points. The trunk diameter is thus robustly estimated from both sides by minimizing the cost $$\underset{{}^F n_d,\, {}^B n_d,\, {}^F O_d,\, {}^B O_d,\, r_d}{\operatorname{argmin}} \sum_{p \in \{F,B\}} e_d^2(X_p, d) + \lambda \sum_c E_1(c, d) \tag{12}$$

$$E_l(c, d) = \|{}_d^c\hat{1}_\alpha - {}^c\hat{1}_a\|^2 + \|{}_d^c\hat{1}_\beta - {}^c\hat{1}_b\|^2$$

where ${}_d{}^c\hat{1}_\alpha$ and ${}_d{}^c\hat{1}_\beta$ are two boundary normal of the trunk d in c-th annotated frame. The trunk diameter is eventually $2r_d$.

Figure 8:
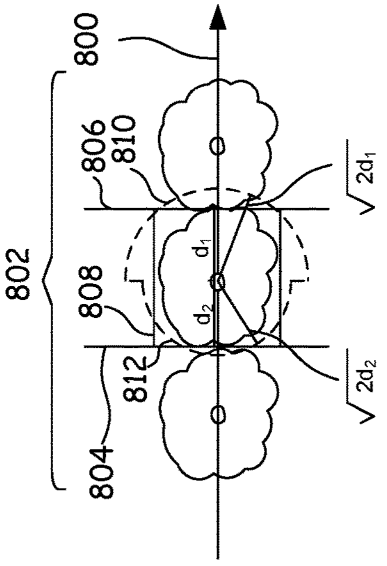
FIG. 8 shows a top view of tree segmentation.

Canopy Volume: Local grounds are removed given refined semantic information $[R_s|t_s]$. As shown in the top view of the merged models of FIG. 8, trunks information indicates the track 800 of the tree row 802. Based on 3D points distribution [Suchet Bargoti, James P Underwood, Juan I Nieto, and Salah Sukkarieh. A pipeline for trunk detection in trellis structured apple orchards. *Journal of Field Robotics,* 32 (8):1075-1094, 2015], initial tree segmentation is performed by cutting planes perpendicular to the row track such as planes 804 and 806. A cuboid bounding box 808 of a tree is created from the perpendicular planes 804 and 806 by connecting planes 804 and 806 with front, back, top and bottom planes such that all of the 3D points of the tree are within cuboid bounding box 808. To take care of the canopy overlap, each half side of a tree is enclosed by a respective half-cylinder with the radius $R_s=\sqrt{2d_s}$, where $d_s$ is the distance from the trunk to the cutting plane resulting in half-cylinder 810 and half-cylinder 812. Each tree is thus segmented by taking the union of the bounding box and two-half cylinders. We build an alpha shape [Herbert Edelsbrunner, David Kirkpatrick, and Raimund Seidel. On the shape of a set of points in the plane. *IEEE Transactions on information theory,* 29(4):551-559, 1983] enclosing all 3D points of each segmented tree by removing small isolated components. The canopy volume is automatically calculated by the alpha-shape algorithm [Herbert Edelsbrunner and Ernst P Mucke. Three-dimensional alpha shapes. *ACM Transactions on Graphics* (*TOG*), 13(1):43-72, 1994].

Tree Height: The outputs of the semantic bundle adjustments discussed above optimized information of trunks and local grounds. Based on the trunk location, the pole in the middle of a tree is first segmented out for modern orchards. A bounding box for each tree is then created to enclose its alpha shape from the local ground plane to the top. The tree height is thus obtained as the height of the bounding box.

Experiments

Both embodiments for merging the front-side and back-side models have been tested.

Testing for First Embodiment

The first embodiment was tested using both simulated and real datasets.

Simulated Dataset:

The purpose of the simulated dataset is to evaluate the accuracy of the method, when we have perfect 3D reconstructions as inputs. A tree row is constructed using 3D models of apple trees and the ground plane is simulated as planar points with Gaussian noise. The row is split into two arbitrary sections and the split reconstructions are transformed using randomly generated rotation, translation and scale. The method of the first embodiment was then applied to these reconstructions. The metric used to evaluate the performance of the first embodiment is the percentage of apples correctly merged. During each split the number of apples belonging to both reconstructions is determined. This is easily accomplished by computing a bounding box for every apple and determining how many of the bounding boxes lie within the intersection of the split clouds. After merging, the number of intersecting bounding boxes is determined to see how many apples were put back together by the merge module.

Figure 9:
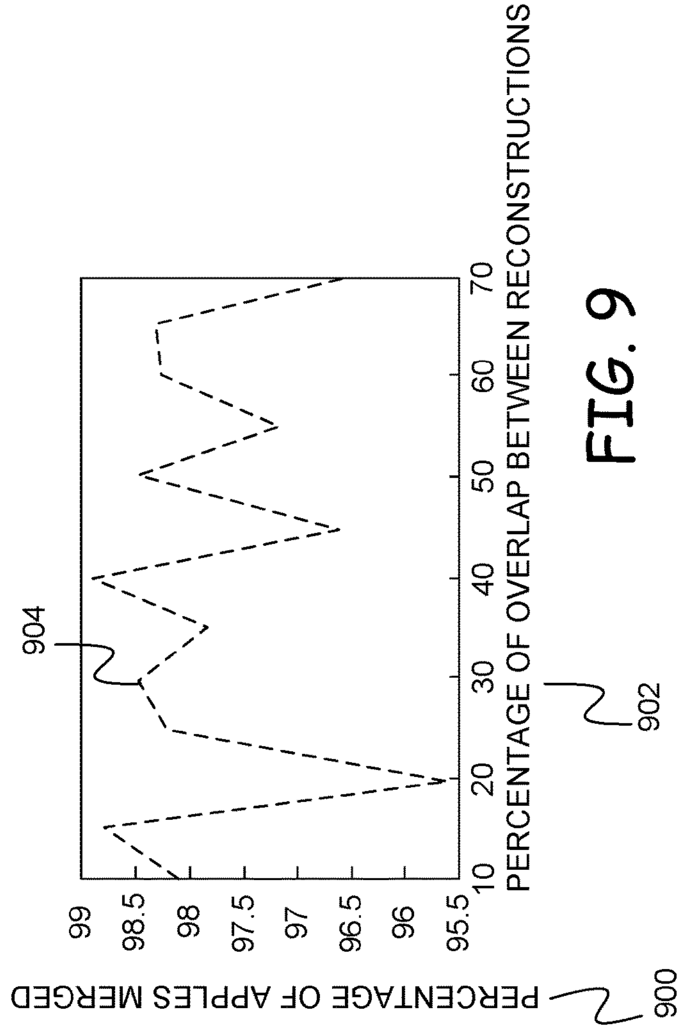
FIG. 9 shows a graph of the relationship between apples merged in a reconstruction to the percentage overlap between reconstructions.

FIG. 9 shows a graph 904 of percentage of merged apples (vertical axis 900) as a function of percentage of overlap (horizontal axis 902). The percentage of overlap is a measure of how much the front and back side models overlapped. For every overlap percentage, the simulation was performed twice. It is evident from FIG. 9 that, that more than 95% of apples were merged for any amount of overlap.

Real Dataset:

In real datasets, the input reconstructions often contain missing components and holes. Therefore, the effectiveness of the merged reconstruction was determined from yield estimation. Specifically, the number of apples from the merged reconstructions are counted and compared to the ground truth as well as single side counts.

Yield Estimation in Apple Orchards: We use two datasets for this purpose:

Dataset1: Dataset1 contains six trees and it has 270 apples in total (Obtained by harvesting).

Dataset2: Dataset2 contains eight trees and it has 274 apples in total (Obtained by harvesting).

Both of these datasets were collected from University of Minnesota Horticultural Research Center and for both these datasets the images were acquired using a Samsung Galaxy S4 cell phone.

We estimate the fruit count from each side of a row and merge them. First, we detect the fruits using our previously developed segmentation method [P. Roy, N. Stefas, C. Peng, H. Bayram, P. Tokekar, and V. Isler, "Robotic surveying of apple orchards," University of Minnesota, Department of Computer Science, Tech. Rep., July 2015]. Afterwards, we back-project the detected fruits in the images to obtain the fruit location in the 3D reconstruction. We perform a connected component analysis to detect the apple clusters in 3D. Then we project individual 3D clusters back to the images by utilizing the recovered camera motion. We count the fruits from these reprojected images using our counting method developed in [P. Roy and V. Isler, "Vision-based apple counting and yield estimation," in Experimental Robotics. Springer, 2016]. A 3D cluster can be tracked over many frames. We choose three frames with the highest amount of detected apple pixels (from the 3D cluster) and report the median count of these three frames as the fruit count for the cluster. We follow this procedure for all the detected 3D clusters and aggregate the fruit count from a single side. It is notable that we remove the apples on the ground for all the single side counts by using our found ground plane.

Figure 10:
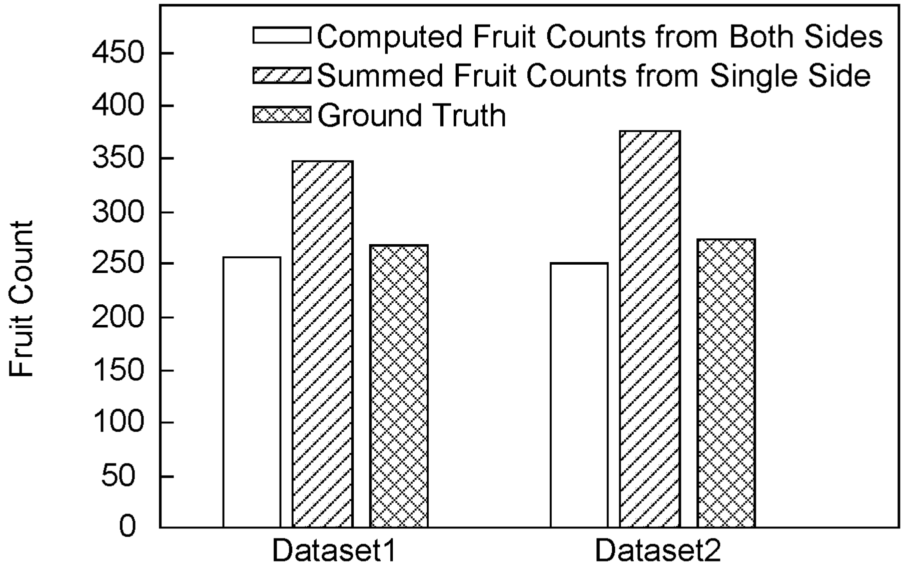
FIG. 10 provides graphs of total fruit counts computed from the merged reconstruction and independent single side reconstructions compared to ground truth.

To merge counts from both sides, we compute the intersection of the connected components from both sides. Afterwards, we compute the total counts by using the inclusion-exclusion principle [T. Andreescu and Z. Feng, "Inclusion-exclusion principle," in *A Path to Combinatorics for Undergraduates*. Springer, 2004, pp. 117-141]. Essentially, we sum up the counts from all the connected components, compute the intersections area among them (among 1, 2 . . . total number of intersecting clusters) and add/subtract the weighted parts accordingly. FIG. 10 shows our result. Our counting accuracy from both sides for Dataset1 and Dataset2 are 94.81% and 91.98%. Compared to the both side count if we just add the single side counts we overcount significantly −128.8% for Dataset1 and 136.86% for Dataset2. Therefore, it is evident that merging the rows from both sides is essential to obtain accurate fruit counts.

Testing for Second Embodiment

Datasets and Evaluation Metrics

The second embodiment was tested using three datasets which are all RGB-D data of apple-tree rows in different orchards separately captured from two sides. Dataset-I is an apple-tree row with a lot of wild weed captured in a horizontal view. Dataset-II is captured in a tilted view with a focus on tree trunks. Dataset-III is collected by a camera attached to a stick in a tilted-top view of three canopies. Our merging algorithm was first performed on each dataset, followed by trunk diameter estimation in Dataset-II, and the estimation of canopy volume and three height in Dataset-III.

Implementation Details

Dataset-I contains 21 trees. Due to the interference of wild weed, only three trunks and three local grounds are used as semantic information for merging algorithm. For Dataset-II, 27 trunks are all annotated with totally 3~4 frames per each from two sides in order to estimate trunks diameter. In Dataset-III, a sub-sample of six trees from 30 are chosen for merging demonstration. Since the focus of this dataset is estimating canopy volume and tree height, only three trunks and their local grounds (the middle and two ends) are marked for merging. We use a caliper to measure the actual trunks diameter as the Ground Truth (GT). The GT of trees height and their canopies diameter is obtained by using a measuring stick and a tape, respectively.

Morphology Estimation Results

Merging 3D Reconstruction: The second embodiment was able to build well-aligned global 3D models of tree rows even without annotation for each tree. Specifically, duplicated poles and trunks are all merged. In general, the merging algorithm only requires two-sides object correspondences around two ends and the middle of each tree row. When there is no need for estimating trunks diameter, we can roughly annotate a long section of a trunk as a cylinder, or even other landmarks, such as supporting poles and stakes. The planar assumption of local ground for each tree makes general our method which can be applied to any orchard environments without concern about the terrain.

Comparison and Analysis: In Dataset-II, we select 14 trees among 27 to demonstrate in detail the accuracy of our algorithm for trunks diameter estimation. If without 2D constraints, trunk diameters are always estimated larger than GT due to unreliable depth values around scene boundaries. Table I shows that with 2D constraints the average error of our diameter estimation is around 5 mm. For small trunks, the estimated results are still larger than GT, since the camera is relatively far from small trunks. Large pixel errors of edge detection (low resolution for trunk boundaries) thus cause the diameter overfitting. It implies that the camera should closely capture these trees with small trunks. In Dataset-III, we perform tree height estimation for 14 trees chosen among 30. Table II shows that the average error of our tree height estimation is around 4 cm. The estimation results for trunk diameter and tree height thus demonstrate the high accuracy of the proposed vision system.

TABLE I

Estimation Errors of Trunk Diameter in Dataset-II

| | Tree ID | | | | | | | | | | | | | | |
|---|---|---|---|---|---|---|---|---|---|---|---|---|---|---|---|
| | T-2 | T-4 | T-6 | T-8 | T-9 | T-11 | T-13 | T-15 | T-18 | T-19 | T-22 | T-24 | T-26 | T-27 | Mean |
| Est. | 5.24 | 5.10 | 5.48 | 8.04 | 6.56 | 6.50 | 5.51 | 5.87 | 5.29 | 5.70 | 5.99 | 5.49 | 5.77 | 5.37 | — |
| GT | 5.39 | 4.12 | 4.77 | 8.22 | 6.68 | 6.82 | 5.08 | 5.23 | 4.37 | 5.00 | 5.70 | 5.63 | 5.24 | 4.61 | — |
| Error (cm) | 0.15 | 0.98 | 0.74 | 0.18 | 0.12 | 0.32 | 0.43 | 0.64 | 0.92 | 0.70 | 0.29 | 0.14 | 0.53 | 0.76 | 0.49 |

TABLE II

Estimation Errors of Tree Height in Dataset-III

| | Tree ID | | | | | | | | | | | | | | |
|---|---|---|---|---|---|---|---|---|---|---|---|---|---|---|---|
| | H-1 | H-2 | H-3 | H-4 | H-5 | H-6 | H-7 | H-16 | H-18 | H-19 | H-20 | H-21 | H-22 | H-23 | Mean |
| Est. | 2.145 | 2.050 | 2.453 | 2.463 | 2.131 | 1.997 | 2.087 | 2.357 | 2.456 | 2.311 | 1.990 | 2.084 | 2.496 | 2.361 | — |
| GT | 2.159 | 2.032 | 2.362 | 2.515 | 2.083 | 1.981 | 2.108 | 2.438 | 2.413 | 2.337 | 2.032 | 2.057 | 2.489 | 2.413 | — |
| Error (m) | 0.014 | 0.018 | 0.091 | 0.052 | 0.048 | 0.016 | 0.021 | 0.081 | 0.043 | 0.026 | 0.042 | 0.027 | 0.007 | 0.052 | 0.038 |

In Dataset-III, we first segment out six sample trees and generate enclosing alpha shapes to represent their canopies. However, the alpha radius should be appropriately chosen. The alpha shape with a small radius value will produce holes inside the canopy, which is not desirable form the view of horticultural study. The best value of alpha radius should represent a canopy model without holes and produce the smallest volume. Thus, we set the radius as 0.8 m within the turning area.

One of the common methods used in horticultural science for modeling canopies is to treat a tree as a cylinder. To show the difference among different models of canopies, we divide 18 trees from Dataset-III into 6 sections based on their relatively similar sizes, and report the mean canopy volume of each section in Table III. It should be noticed that simple cylinder model overestimates the canopy volume. Thus, it is reasonable to consider that our proposed method for canopy volume estimation is more suitable to generalize the geometry of tree structures, which is promising to build the ground truth of tree canopies for horticulturists using the proposed vision system.

TABLE III

Mean Canopy Volume of 6 Tree Sections Using Different Models

| | Section ID of Mean Canopy Volume ($m^3$) | | | | | |
|---|---|---|---|---|---|---|
| Model | V-1 | V-2 | V-3 | V-4 | V-5 | V-6 |
| Cylinder | 2.957 | 3.105 | 2.503 | 2.185 | 3.155 | 3.307 |
| Alpha Shape | 1.585 | 1.873 | 1.351 | 1.227 | 1.777 | 1.912 |
| Convex Hull | 1.805 | 2.177 | 1.460 | 1.322 | 2.064 | 2.202 |

Figure 11:
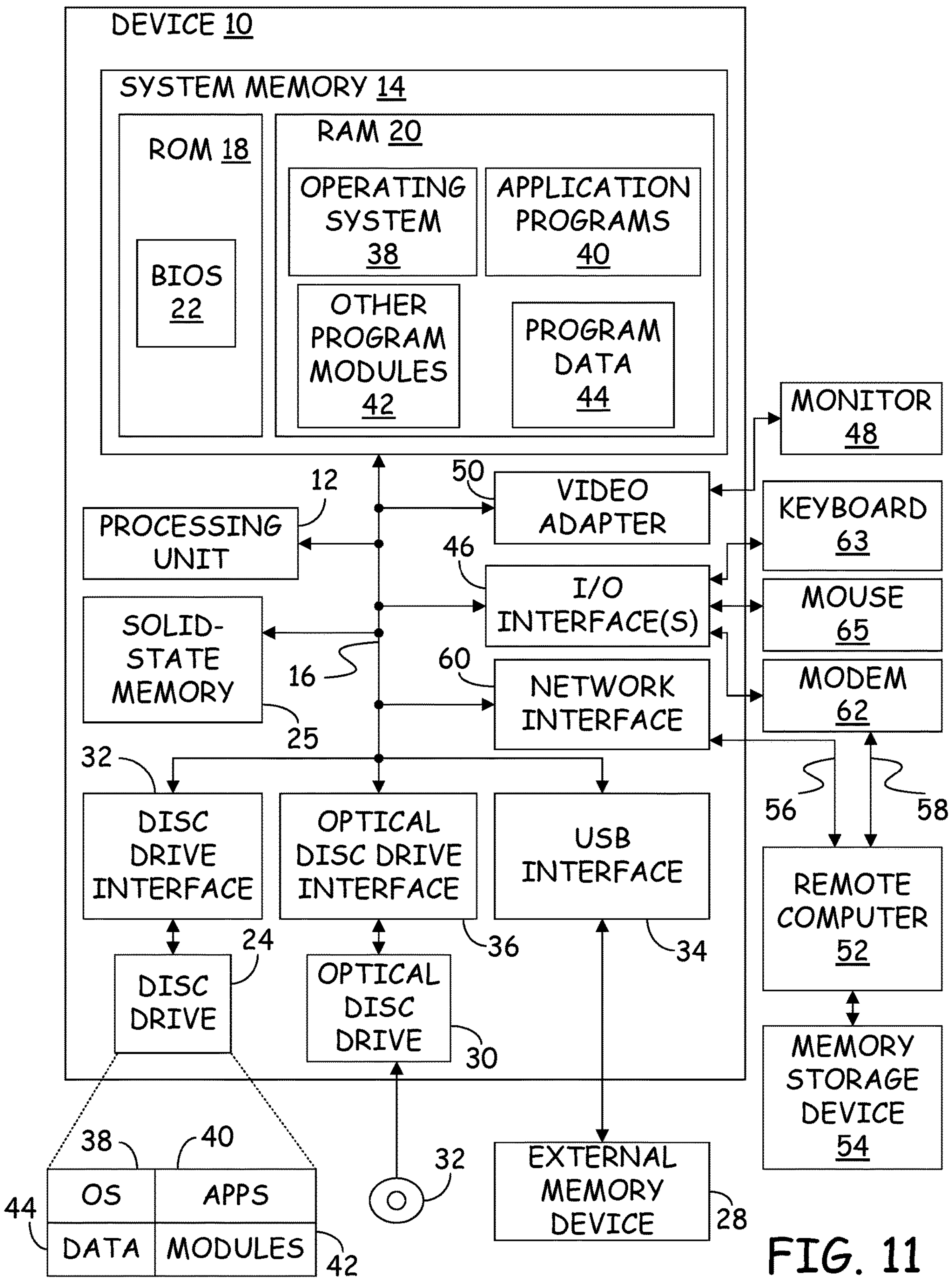
FIG. 11 is a block diagram of a computing environment used in accordance with the various embodiments.

FIG. 11 provides an example of a computing device 10 that can be used as a server or client device in in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing any one of modules discussed above. Program data 44 may include any data used by the systems and methods discussed above including image frames 106 and 108.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 11. The network connections depicted in FIG. 11 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 11 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A method comprising:

constructing a three-dimensional model of a front side of a row of trees based on a plurality of images of the front side of the row of trees;

constructing a three-dimensional model of a back side of the row of trees based on a plurality of images of the back side of the row of trees;

merging the three-dimensional model of the front side of the row of trees with the three-dimensional model of the back side of the row of trees by linking a trunk in the three-dimensional model of the front side to a trunk in the three-dimensional model of the back side to form a merged three-dimensional model of the row of trees wherein merging the three-dimensional model of the front side of the row of trees with the three-dimensional model of the back side of the row of trees comprises:

projecting the three-dimensional model of the front side of the row of trees onto a plane to form a first projection;

projecting the three-dimensional model of the back side of the row of trees onto the plane to form a second projection;

aligning the second projection with the first projection to determine a translation used to merge the three-dimensional model of the front side of the row of trees with the three-dimensional model of the back side of the row of trees; and using the merged three-dimensional model of the row of trees to determine a physical attribute of the row of trees.

2. The method of claim 1 further comprising:

identifying a depth position for a trunk of a tree in the three-dimensional model of the front side of the row of trees;

identifying a depth position for the trunk of the tree in the three-dimensional model of the back side of the row of trees; and aligning the three-dimensional model of the back side of row with the three-dimensional model of the front side of the row along a depth direction by aligning the depth position of the trunk of the tree in the three-dimensional model of the front side of the row of trees with depth position of the trunk of the tree in the three-dimensional model of the back side of the row of trees.

3. The method of claim 2 wherein identifying a depth for a trunk in the three-dimensional model of the front side of the row of trees comprises identifying a median depth for the trunks of all trees in the three-dimensional model of the front side of the row of trees.

4. A method comprising:

constructing a three-dimensional model of a front side of a row of trees based on a plurality of images of the front side of the row of trees;

constructing a three-dimensional model of a back side of the row of trees based on a plurality of images of the back side of the row of trees;

identifying front trunk points in the three-dimensional model of the front side that belong to a trunk of a tree and identifying back trunk points in the three-dimensional model of the back side that belong to the trunk of the tree; and using the front trunk points and the back trunk points to align the three-dimensional model of the front side with the three-dimensional model of the back side wherein using the front trunk points and the back trunk points comprises identifying a front median plane from the front trunk points and a back median plane from the back trunk points and aligning the front median plane and the back median plane to determine a depth alignment for aligning the three-dimensional model of the back side with three-dimensional model of the front side.

5. The method of claim 4 further comprising:

projecting the three-dimensional model of the front side onto a plane to produce a front side projection;

projecting the three-dimensional model of the back side onto the plane to produce a back side projection; and aligning the back side projection with the front side projection to produce a translation that aligns the three-dimensional model for the back side with the three-dimensional model for the front side.

6. A computing device comprising:

a memory containing front side image frames and back side image frames for an orchard row;

a processor executing instructions to perform steps comprising:

constructing a three-dimensional model of a front side of the orchard row from the front side image frames;

constructing a three-dimensional model of a back side of the orchard row from the back side image frames;

identifying a front trunk descriptor from the three-dimensional model of the front side;

identifying a back trunk descriptor from the three-dimensional model of the back side; and using the front trunk descriptor and the back trunk descriptor to align the three-dimensional model of the back side with the three-dimensional model of the front side wherein the front trunk descriptor comprises a front median trunk plane and the back trunk descriptor comprises a back median trunk plane and using the front median trunk plane and the back median trunk plane comprise aligning the back median trunk plane to the front median trunk plane.

7. A computing device comprising:

a memory containing front side image frames and back side image frames for an orchard row;

a processor executing instructions to perform steps comprising:

constructing a three-dimensional model of a front side of the orchard row from the front side image frames;

constructing a three-dimensional model of a back side of the orchard row from the back side image frames;

identifying a front trunk descriptor from the three-dimensional model of the front side;

identifying a back trunk descriptor from the three-dimensional model of the back side; and using the front trunk descriptor and the back trunk descriptor to align the three-dimensional model of the back side with the three-dimensional model of the front side wherein the front trunk descriptor comprises a front axis and the back trunk descriptor comprises a back axis and using the front axis and the back axis comprises rotating the back axis to be closer to parallel to the front axis to align the three-dimensional model of the back side with the three-dimensional model of the front side.

8. The computing device of claim 7 wherein the front trunk descriptor further comprises a front origin and the back trunk descriptor further comprises a back origin and using the front origin and the back origin comprises shifting the back origin so that a difference between the shifted back origin and the front origin is closer to parallel to the front axis.

9. A method comprising:

constructing a three-dimensional model of a front side of a row of trees based on a plurality of images of the front side of the row of trees;

constructing a three-dimensional model of a back side of the row of trees based on a plurality of images of the back side of the row of trees;

merging the three-dimensional model of the front side of the row of trees with the three-dimensional model of the back side of the row of trees by linking a trunk in the three-dimensional model of the front side to a trunk in the three-dimensional model of the back side to form a merged three-dimensional model of the row of trees wherein merging the three-dimensional model of the front side of the row of trees with the three-dimensional model of the back side of the row of trees comprises:

constructing a respective three-dimensional cylinder for at least two tree trunks in each of the three-dimensional model of the front side of the row of trees and the three-dimensional model of the back side of the row of trees, each three-dimensional cylinder having an axis; and identifying a transformation to apply to the three-dimensional model of the back side of the row of trees by attempting to make the axis of each cylinder of the three-dimensional model of the back side of the row of trees parallel to the axis of each respective cylinder of the three-dimensional model of the front side of the row of trees identifying an origin of each cylinder for at least two tree trunks in each of the three-dimensional model of the front side of the row of trees and the three-dimensional model of the back side of the row of trees; and identifying a transformation to apply to the three-dimensional model of the back side of the row of trees by attempting to vertically align the origin of each cylinder of the three-dimensional model of the back side of the row of trees parallel to the origin of each respective cylinder of the three-dimensional model of the front side of the row of trees; and using the merged three-dimensional model of the row of trees to determine a physical attribute of the row of trees.

10. The method of claim 9 wherein merging the three-dimensional model of the front side of the row of trees with the three-dimensional model of the back side of the row of trees further comprises:

identifying a ground plane in each of the three-dimensional model of the front side of the row of trees and the three-dimensional model of the back side of the row of trees, the ground plane having an origin; and identifying a transformation to apply to the three-dimensional model of the back side of the row of trees by attempting to place the origin of the ground plane of the three-dimensional model of the back side of the row of trees at a same height as the origin of the ground plane of the three-dimensional model of the front side of the row of trees.

11. The method of claim 9 wherein using the front cylinder and the back cylinder to align the three-dimensional model of the front side with the three-dimensional model of the back side comprises using an alignment of an origin of the front cylinder to an origin the back cylinder relative to an axis of the front cylinder as a second factor in the joint optimization.

12. The method of claim 11 further comprising:

identifying a front ground plane proximate the front cylinder, the front ground plane having a normal and an origin;

identifying a back ground plane proximate the back cylinder, the back ground plane having a normal and an origin; and using an orientation of normal of the back ground plane to the normal of the front ground plane as a third factor in the joint optimization.

13. The method of claim 12 further comprising using a using an alignment of an origin of the front ground plane to an origin the back ground plane relative to the normal of the front ground plane as a fourth factor in the joint optimization.

14. The method of claim 9 further comprising using the front cylinder and the back cylinder in semantic bundle adjustment to adjust camera poses of the plurality of images.

15. A method comprising:

constructing a three-dimensional model of a front side of a row of trees based on a plurality of images of the front side of the row of trees;

constructing a three-dimensional model of a back side of the row of trees based on a plurality of images of the back side of the row of trees;

identifying front trunk points in the three-dimensional model of the front side that belong to a trunk of a tree and identifying back trunk points in the three-dimensional model of the back side that belong to the trunk of the tree; and using the front trunk points and the back trunk points to align the three-dimensional model of the front side with the three-dimensional model of the back side by forming a front cylinder from the front trunk points and a back cylinder from the back trunk points and using the front cylinder and the back cylinder to align the three-dimensional model of the front side with the three-dimensional model of the back side by using an orientation of an axis of the back cylinder relative to an orientation of an axis of the front cylinder as one factor in a joint optimization.

* * * * *